(12) United States Patent
Grah (10) Patent No.: US 11,725,089 B2
(45) Date of Patent: *Aug. 15, 2023

(54) LAMINATE CONTAINING COATED POLYESTER FILM

(71) Applicant: Mitsubishi Polyester Film, Inc., Greer, SC (US)

(72) Inventor: Michael Daniel Grah, Greenville, SC (US)

(73) Assignee: Mitsubishi Chemical America, Inc., Greer, SC (US)

( * ) Notice: Subject to any disclaimer, the term of this patent is extended or adjusted under 35 U.S.C. 154(b) by 81 days.

This patent is subject to a terminal disclaimer.

(21) Appl. No.: 17/110,649

(22) Filed: Dec. 3, 2020

(65) Prior Publication Data

US 2021/0086486 A1 Mar. 25, 2021

Related U.S. Application Data

(63) Continuation of application No. 14/824,442, filed on Aug. 12, 2015, now Pat. No. 10,882,284.

(Continued)

(51) Int. Cl.
*C08J 7/043* (2020.01)
*B32B 27/08* (2006.01)
(Continued)

(52) U.S. Cl.
CPC .............. *C08J 7/043* (2020.01); *B32B 7/12* (2013.01); *B32B 15/095* (2013.01); *B32B 27/08* (2013.01); *B32B 27/18* (2013.01); *B32B 27/32* (2013.01); *B32B 27/36* (2013.01); *B32B 27/40* (2013.01); *C08J 7/0427* (2020.01); *C09J 7/22* (2018.01);

(Continued)

(58) Field of Classification Search
None
See application file for complete search history.

(56) References Cited

U.S. PATENT DOCUMENTS 3,758,629 A 9/1973 Thill
3,905,931 A 9/1975 Ziegert
(Continued)

FOREIGN PATENT DOCUMENTS

DE 102006016635 10/2007
DE 102007026553 12/2008
(Continued)

OTHER PUBLICATIONS

"2012 Additives Handbook," Pci Magazine, Jun. 1, 2012.
(Continued)

*Primary Examiner* — Prashant J Khatri
(74) *Attorney, Agent, or Firm* — Dority & Manning, P.A.

(57) ABSTRACT

A bonding material is described that is well suited to bonding polymer films, such as polyester films, to other substrates. In one embodiment, for instance, the bonding material can be used to bond a polyester film to a polypropylene article. The bonding material generally comprises an adhesive agent combined with a cross-linking agent. The adhesive agent may comprise a carboxylic acid modified polypropylene homopolymer, copolymer or ionomer. In one embodiment, the adhesive agent comprises a polypropylene modified by an unsaturated dicarboxylic acid anhydride. The cross-linking agent, on the other hand, may comprise an oxazoline polymer.

26 Claims, 2 Drawing Sheets

Related U.S. Application Data (60) Provisional application No. 62/037,326, filed on Aug. 14, 2014.

(51) Int. Cl.

| | | |
|---|---|---|
| *B32B 7/12* | (2006.01) | |
| *B32B 27/18* | (2006.01) | |
| *B32B 27/40* | (2006.01) | |
| *B32B 27/36* | (2006.01) | |
| *B32B 15/095* | (2006.01) | |
| *B32B 27/32* | (2006.01) | |
| *C09J 151/00* | (2006.01) | |
| *C09J 7/35* | (2018.01) | |
| *C09J 7/22* | (2018.01) | |
| *C08J 7/04* | (2020.01) | |

(52) U.S. Cl.
CPC ............... *C09J 7/35* (2018.01); *C09J 151/00* (2013.01); *B32B 2255/10* (2013.01); *B32B 2255/26* (2013.01); *B32B 2305/08* (2013.01); *B32B 2307/518* (2013.01); *B32B 2323/10* (2013.01); *C08J 2367/02* (2013.01); *C08J 2423/26* (2013.01); *C08J 2451/06* (2013.01); *C09J 2451/00* (2013.01); *C09J 2467/006* (2013.01)

(56) References Cited

U.S. PATENT DOCUMENTS

| | | |
|---|---|---|
| 4,297,449 A | 10/1981 | Goto et al. |
| 4,379,806 A | 4/1983 | Korpman |
| 4,389,437 A | 6/1983 | Hungerford |
| 4,474,928 A | 10/1984 | Hoenig et al. |
| 4,499,130 A | 2/1985 | Questel et al. |
| 4,532,187 A | 7/1985 | Hoenig et al. |
| 4,626,575 A | 12/1986 | Goel |
| 4,631,233 A | 12/1986 | Kan |
| 4,631,308 A | 12/1986 | Graham et al. |
| 4,632,869 A | 12/1986 | Park et al. |
| 4,771,108 A | 9/1988 | Mackenzie |
| 4,965,126 A | 10/1990 | Abraham et al. |
| 5,161,093 A | 11/1992 | Gorczyca et al. |
| 5,192,620 A | 3/1993 | Chu et al. |
| 5,206,279 A | 4/1993 | Rowland et al. |
| 5,242,757 A | 9/1993 | Buisine et al. |
| 5,328,762 A | 7/1994 | Takahashi et al. |
| 5,532,058 A | 7/1996 | Rolando |
| 5,591,806 A | 1/1997 | Recchia et al. |
| 5,637,366 A | 6/1997 | Davis et al. |
| 5,776,604 A | 7/1998 | Lu et al. |
| 5,777,714 A | 7/1998 | Conway |
| 5,990,226 A | 11/1999 | Arita et al. |
| 6,114,021 A | 9/2000 | Pankratz et al. |
| 6,124,398 A | 9/2000 | Imashiro et al. |
| 6,165,602 A | 12/2000 | Fujita |
| 6,221,191 B1 | 4/2001 | Davis et al. |
| 6,228,500 B1 | 5/2001 | Hiroshige et al. |
| 6,555,240 B1 | 4/2003 | Nishikori et al. |
| 6,753,379 B1 | 6/2004 | Kawate et al. |
| 6,872,458 B1 | 3/2005 | Rudd et al. |
| 7,666,941 B2 | 2/2010 | Shiba et al. |
| 7,722,949 B2 | 5/2010 | Ichiroku |
| 8,535,774 B2 | 9/2013 | Okumura et al. |
| 8,614,002 B2 | 12/2013 | Isaki et al. |
| 8,652,642 B2 | 2/2014 | Masuda et al. |
| 8,941,003 B2 | 1/2015 | Mandokoro et al. |
| 9,206,295 B2 | 12/2015 | Kiehne et al. |
| 9,636,893 B2 | 5/2017 | Markowski et al. |
| 10,072,143 B2 | 9/2018 | Ohfuji et al. |
| 2002/0187328 A1 | 12/2002 | Murschall |
| 2005/0069716 A1 | 3/2005 | Sun et al. |
| 2005/0075428 A1 | 4/2005 | Ddamulira et al. |
| 2005/0084693 A1 | 4/2005 | Labrec |
| 2005/0191464 A1 | 9/2005 | Takahashi et al. |
| 2006/0147720 A1 | 7/2006 | Moore |
| 2006/0205869 A1 | 9/2006 | Steidl et al. |
| 2006/0293424 A1 | 12/2006 | Tse et al. |
| 2007/0009750 A1 | 1/2007 | Ito et al. |
| 2007/0021566 A1 | 1/2007 | Tse et al. |
| 2007/0240075 A1 | 10/2007 | Jesberger et al. |
| 2007/0248810 A1 | 10/2007 | McGee et al. |
| 2008/0032148 A1 | 2/2008 | Lee et al. |
| 2008/0050583 A1 | 2/2008 | Kobo |
| 2008/0053512 A1 | 3/2008 | Kawashima |
| 2008/0145670 A1 | 6/2008 | Song et al. |
| 2009/0041983 A1 | 2/2009 | Gaeta et al. |
| 2009/0061137 A1 | 3/2009 | Konrad et al. |
| 2009/0061138 A1 | 3/2009 | Peiffer et al. |
| 2009/0068483 A1 | 3/2009 | Morikawa et al. |
| 2009/0104830 A1 | 4/2009 | Ikeda |
| 2009/0214854 A1 | 8/2009 | Okawara et al. |
| 2009/0269580 A1 | 10/2009 | Shiba et al. |
| 2009/0280318 A1 | 11/2009 | Matsugi et al. |
| 2009/0291284 A1 | 11/2009 | Frauenhofer et al. |
| 2010/0000603 A1 | 1/2010 | Tsuzuki et al. |
| 2010/0215902 A1 | 8/2010 | Kiehne et al. |
| 2010/0288353 A1 | 11/2010 | Kliesch et al. |
| 2010/0294363 A1 | 11/2010 | Gust |
| 2011/0045288 A1 | 2/2011 | Koda et al. |
| 2011/0051245 A1 | 3/2011 | Masuda et al. |
| 2011/0112249 A1 | 5/2011 | Takarada et al. |
| 2011/0135916 A1 | 6/2011 | Lu |
| 2011/0151167 A1 | 6/2011 | Okumura et al. |
| 2011/0209747 A1 | 9/2011 | Shi |
| 2011/0223419 A1 | 9/2011 | Okawara et al. |
| 2012/0095164 A1 | 4/2012 | Blum et al. |
| 2013/0115448 A1 | 5/2013 | Kodama et al. |
| 2013/0133743 A1 | 5/2013 | Grah |
| 2014/0079948 A1 | 3/2014 | Ishida et al. |
| 2014/0134475 A1 | 5/2014 | Kuramoto et al. |
| 2014/0147642 A1 | 5/2014 | Weinberg et al. |
| 2014/0170400 A1 | 6/2014 | Gilliam et al. |
| 2014/0356618 A1 | 12/2014 | Hosoda et al. |
| 2015/0184014 A1 | 7/2015 | Nakahara |
| 2015/0210879 A1 | 7/2015 | Takegami |
| 2015/0367610 A1 | 12/2015 | Araki et al. |
| 2016/0046104 A1 | 2/2016 | Grah |
| 2016/0046105 A1 | 2/2016 | Markowski et al. |

FOREIGN PATENT DOCUMENTS

| | | |
|---|---|---|
| EP | 2179844 | 4/2010 |
| EP | 2556958 | 2/2013 |
| EP | 26262040 | 8/2013 |
| EP | 2881254 | 6/2015 |
| JP | 2006332091 | 12/2006 |
| JP | 2009235290 | 10/2009 |
| JP | 2010109240 | 5/2010 |
| JP | 2010251679 | 11/2010 |
| JP | 2010287662 | 12/2010 |
| JP | 2011116133 | 6/2011 |
| JP | 2011230502 | 11/2011 |
| JP | 2012201043 | 10/2012 |
| JP | 2012216364 | 11/2012 |
| JP | 2013188977 | 9/2013 |
| WO | WO2013140966 | 9/2013 |
| WO | WO2014021445 | 2/2014 |
| WO | WO2014057776 | 4/2014 |
| WO | WO2014109341 | 7/2014 |

OTHER PUBLICATIONS

"2PAUN Adherable Film," Product Bulletin, Mitsubishi Poyester Film, Inc., 2013, 2 pages.

Etcheverry et al. "Glass Fiber Reinforced Polypropylene Mechanical Properties Enhancement by Adhesion Improvement." Materials, 5, 2012, pp. 1084-1113.

International Search Report PCT/US2015/044788 dated Nov. 19, 2015, 14 pages.

Michem Emulsion 09625 Technical Data Sheet, no date present.

(56) References Cited

OTHER PUBLICATIONS

"Oxazoline functionalized reactive copolymers—Novel Low Toxic Polymer Crosslink and Adhesion Promoting agent for waterborne," EPOCROS, Nippon Shokubai Co., Ltd., Feb. 28, 2014, 8 pages.
PKHW-38: Waterborne Dispersion for High-Resistant WB Coatings Product Sheet, www.phenoxy.com; Sep. 28, 2011.
"RTPA1 Opaque White Film," Product Bulletin, Mitsubishi Poyester Film, Inc., 2015, 2 pages.
Schimtz, Peter et al., "Films." Ullmann's Encyclopedia of Industrial Chemistry, 5th Ed., vol. A11 (1988), pp. 85-110.

FIG. 2B

LAMINATE CONTAINING COATED POLYESTER FILM

RELATED APPLICATIONS

The present application is a continuation of U.S. patent application Ser. No. 14/824,442, filed on Aug. 12, 2015, which claims priority to U.S. Provisional Patent Application Ser. No. 62/037,326 filed on Aug. 14, 2014 and herein incorporated by reference.

BACKGROUND

Polyester films have many useful properties that make them well suited for use in many different applications. For example, polyester films have relatively high strength and stiffness, making them well suited for use in tags and labels. Of particular advantage, polyester films can be produced having transparent clarity. Consequently, polyester films are typically used as a protective overlayer, such as a safety film for windows. Polyester films also have excellent thermal stability and chemical resistance. The films can be used as packaging materials for items that are placed in an oven. The films can also be used for electrical insulation. Polyester films are well suited for incorporation into laminated objects that benefit from the inherent polyester polymer, such as polyethylene terephthalate, properties.

Unfortunately, however, problems have been experienced in adhering polyester films to other polymeric articles, such as other polymer films. Consequently, those skilled in the art have attempted to create different adhesive layers or tie layers for application to polyester films that allow the films to be bonded to other materials. For example, U.S. Patent Application Publication No. 2008/0050583, U.S. Patent Application Publication No. 2010/0215902 and U.S. Patent Application Publication No. 2013/0133743 disclose various adhesive layers for adhering polyester films to EVA layers. The resulting laminated structures may be used as a backing material for a device, such as a solar cell.

Although various adhesive layers have been proposed for use in bonding polyester films to various other materials, problems still remain in attempting to bond polyester films to polyolefin articles, particularly articles made from polypropylene. In particular, a need exists for an adhesive or tie layer that can be applied directly to a polyester film for later bonding to a polypropylene substrate.

SUMMARY

The present disclosure is generally directed to a coating that can be applied to a polyester film for improving adhesion between the polyester film and a second polymeric layer. The invention is particularly effective when utilized to bond a polyethylene terephthalate sheet to a polypropylene article. Of particular advantage, the adhesive coating is particularly resistant to degradation caused by weathering, and is capable of retaining a relatively large amount of its initial bond strength between the two layers even after exposure for many hours to an environment at a relatively high temperature and/or at relatively high humidity levels.

Of particular advantage, the coating composition of the present disclosure has also demonstrated excellent adhesion to polyester films that contain various fillers. For example, in one embodiment, the polyester film may contain a significant amount of while pigment particles, such as barium sulfate particles or titanium dioxide particles. The white pigment particles are added to the film, in one embodiment, to provide the film with a white color, such that the film has a Berger whiteness of greater than 70, such as greater than 75, such as greater than 80. The white pigment particles are included in the film so that the film has desired weatherability, reflectance, or appearance properties.

In general, the coating applied to the polyester film comprises an adhesive agent combined with a cross-linking agent. The adhesive agent may comprise, for instance, an acid or an acid anhydride modified olefin polymer. The acid or acid anhydride modified olefin polymer may comprise a modified polypropylene polymer, such as a polypropylene homopolymer or copolymer. In one particular embodiment, the adhesive agent comprises a carboxylic acid modified olefin polymer, such as a carboxylic acid modified polypropylene homopolymer or copolymer. As used herein, a carboxylic acid modified olefin polymer includes olefin polymers modified by a carboxylic acid anhydride. The cross-linking agent, on the other hand, may comprise an oxazoline modified acrylic polymer, a carbodiimide polymer, an epoxy, an isocyanate, or a melamine. In one embodiment, for instance, the cross-linking agent comprises an oxazoline polymer, such as an oxazoline-modified acrylic polymer.

In one embodiment, the polyester film is at least uniaxially stretched. For example, in one embodiment, the film can be biaxially stretched. In order to form the coating on the first side of the film, a coating composition is dispersed in a liquid carrier and can be applied to the film prior to complete stretching of the film. For instance, in one embodiment, the coating dispersion can be applied prior to stretching the film in the cross-direction. During stretching, the coating composition is heated and consolidated to form a coating on the film.

In addition to a coated film, the present disclosure is also directed to a laminate comprising a polyester film bonded to a polymer article. The polymer article, for instance, may comprise a polypropylene article, such as an article made from a polypropylene homopolymer. In one embodiment, the polymer article may comprise a polyethylene article, such as an article made from a polyethylene homopolymer or copolymer. In one embodiment, the polymer article may comprise an ethylene-propylene article, such as an article made from an ethylene-propylene copolymer. The polymer article may be a film, a sheet, or can be a molded article.

The coating or bonding layer is capable of forming strong bonds between the polyester film and the polymer article. For instance, the initial bond strength between the polyester film and the polymer article can be at least about 5 lbf/inch.

In addition to having excellent initial bond strength characteristics, the bonding layer is also capable of retaining its bond strength between the layers even after exposure to relatively high temperatures for extended periods of time.

Laminates made in accordance with the present disclosure can have various different uses. In one embodiment, for instance, the resulting laminate may comprise a multi-layer film or sheet, such as a packaging film. In an alternative embodiment, the resulting laminate may comprise a molded article, such as a molded article made from a fiber reinforced polypropylene. The molded article, for instance, may comprise a tray, panel, laminated scrim or sheet, or molded laminate structure.

In one embodiment, the polyester film includes a first coating on a first side comprising the adhesive agent and the cross-linking agent. The polyester film can include a second coating on the second side of the film. In one embodiment, the second coating may comprise also the adhesive agent combined with the cross-linking agent. In this manner, laminates can be made in which the film can be bonded to polyolefin polymer layers or articles on each side of the film. In an alternative embodiment, the second coating may only comprise the cross-linking agent. The cross-linking agent, for instance, by itself can be used to bond the second side of the film to a polyurethane polymer. For instance, in one embodiment, the film can be bonded to a polyurethane adhesive. The polyurethane adhesive, in turn, can be used to bond the film to a shaped article, such as a metallic, ceramic, paper, or wood-based article. In one embodiment, the article may be a metallic article. Thus, in one embodiment, a laminate can be formed that can include a polypropylene article bonded to the polyester film which in turn is bonded to a metallic article via a polyurethane adhesive.

Other features and aspects of the present disclosure are discussed in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present invention.

In general, the present disclosure is directed to a coated polymer film and particularly to a coated polyester film. The coating contained on the film is for attaching the film to other substrates, such as molded articles, sheets, or films. For example, the coating is particularly well suited for attaching a polyester film to a polymer article, particularly a polymer article made from a polypropylene polymer, such as a polypropylene homopolymer.

Polypropylene articles are used in numerous applications. For instance, polypropylene polymers are used to produce nonwoven webs, films, and molded articles. Many multilayer films, such as packaging films, include a polypropylene layer. In addition, fiber reinforced polypropylene, such as fiberglass reinforced polypropylene, is emerging as a popular structural material for many different applications due to its low cost, light weight, stiffness, good mechanical properties, and inherent recyclability. Polypropylene polymers, including fiber reinforced polypropylene polymers, are easy to mold and can be used to produce articles having multiple different shapes. In accordance with the present disclosure, a polyester film can be laminated to the polypropylene article, such as any of the articles described above. Once thermally bonded in accordance with the present disclosure, the polyester film forms a secure and strong bond with the polypropylene surface.

Once attached to the polymer article, such as the polypropylene article, the polyester film of the present disclosure can provide numerous benefits and advantages. For instance, the polyester film can act as a skin layer or protective layer that can provide excellent scratch resistant properties and cut resistant properties. The polyester film also possesses better environmental resistance, chemical resistance, and stain resistance than the underlying polypropylene polymer. In addition, the polyester film can provide the resulting article with aesthetic appeal.

Although the use of a polyester film can provide numerous advantages when laminated to a polypropylene article, in the past problems were experienced in obtaining a strong, robust adhesive bond between the two materials. For example, in the past, problems with delamination have been experienced when attempting to thermally laminate a polyester film to a polypropylene article.

The coated polyester film of the present disclosure, however, can directly bond to a polypropylene surface on a polymer article. Further, after processing, the adherent polyester film layer retains excellent adhesion, provides a skin layer function, and maintains the overall thermoplastic recyclability of the entire product.

In fact, the bond formed between the polyester film and the polymer article can withstand not only high temperatures, but also wet and humid environments.

In one embodiment, the bonding material of the present disclosure can be applied to the polymer film as a coating prior to laminating the film to a polymeric substrate. In one embodiment, the bonding material can be used to bond numerous different polymeric films together. For example, in one embodiment, the bonding material can be used to bond together a polyester film to a layer containing an olefin polymer. For instance, the polymeric layer may comprise a polyethylene, such as linear low density polyethylene, a polypropylene, mixtures thereof, and copolymers thereof. In other embodiments, the polymeric layer may contain one or more ionomers or elastomers.

In other embodiments, the coated polymer film of the present disclosure can be bonded to a molded article. The molded article can be made from an olefin polymer, such as polypropylene. The molded article, for instance, may comprise a tray wherein the coated polymer film forms a protective layer on the tray.

The bonding material of the present disclosure exhibits excellent initial bond strength to both PET and the polymer article, as well as excellent retained bond strength after exposure to retort conditions. It is believed that good initial bond strength is achieved due to good mechanical and chemical compatibility between the bonding material and polymer surface as well as many strong covalent bonds with both the polymer article and the surface of the PET. Retort testing is conducted on packaging materials to simulate the retort process commonly conducted on packaged food items to kill bacteria and render the food package shelf stable. This process typically exposes the package to conditions of 121° C. for 60-180 minutes and 100% relative humidity. It is believed that the excellent retained bond strength after retort testing results from the strong, hydrolytically stable bonds produced when the coating reacts with the surface of the PET and the polymer article. Further, it is believed that the hydrophobic nature of the components utilized in the bonding layer minimize the solubility and concentration of water molecules at bonding interfaces during the retort process, further enhancing the hydrolytic stability of the bonding interfaces.

The bonding material of the present disclosure exhibits excellent initial bond strength. In some embodiments, peel tests measuring the adhesive strength between homopolymer polypropylene sheet and the coated film fail by tearing of the PET base film before the adhesive layer fails. Thus, the peel test result is limited by the thickness and strength of the base film. For example, the initial bond strength or peel strength between the polymer film layer and a polypropylene layer may be greater than about 4 lbf/inch, such as greater than about 5 lbf/inch, such as greater than about 7 lbf/inch, such as greater than about 10 lbf/inch and less than about 30 lbf/inch, such as less than about 20 lbf/inch, such as less than about 15 lbf/inch, such as less than about 10 lbf/inch. The initial bond strength or peel strength may be from about 4 to about 25 lbf/inch, such as from about 4.5 to about 20 lbf/inch, such as from about 5 to 15 lbf/inch, such as from about 5 to about 10 lbf/inch. In particular, the initial bond strength or peel strength may be greater than about 4 lbf/inch if the base film is about 1 mil thick, such as greater than about 5 lbf/inch if the base film is about 1.5 mil thick, such as greater than about 7 lbf/inch if the base film is about 2 mil thick.

Figure 2A:
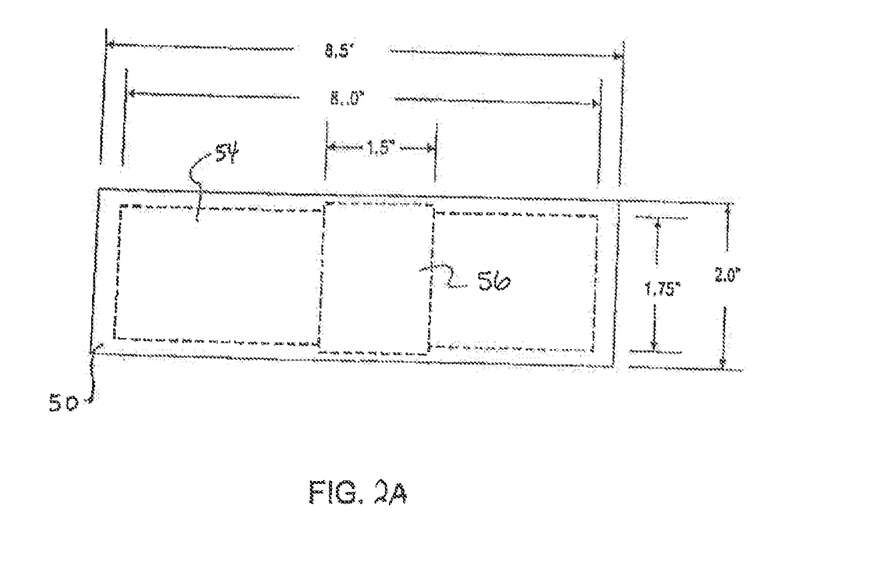
FIGS. 2A and 2B are a plan view and a side view respectively of a sample preparation for conducting the peel test as described hereinafter.
Figure 2B:
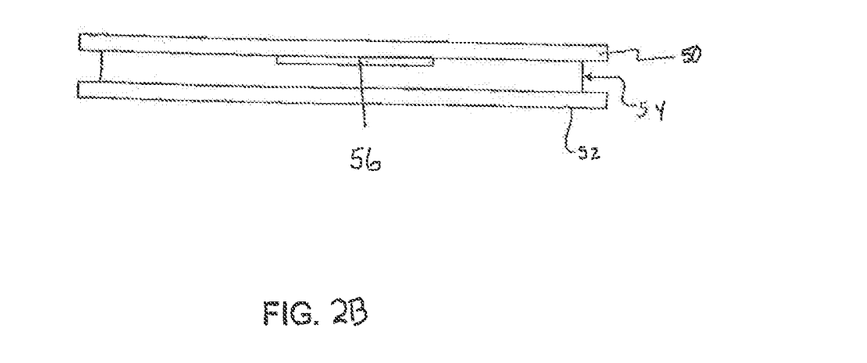

In order to determine the peel strength of a bonding material in accordance with the present disclosure, a sample as shown in FIGS. 2A and 2B is first prepared. As illustrated, the sample includes a polypropylene layer 54 positioned in between two polyester film layers 50 and 52. A release sheet 56 is placed in between the polyester film layer 50 and the polypropylene layer 54. The release sheet can comprise, for instance, a fabric coated with a fluorocarbon such as TEFLON polymer.

Once the layers are brought together as shown in FIGS. 2A and 2B, the sample is placed in thermal laminator. The laminate is compressed between two platens set at 400° F. for 9 seconds and 50 psi pressure. After lamination, the platens are opened and the laminate is removed and allowed to cool in air.

Once the laminate sample is prepared as shown in FIG. 2A, it is cut into 25 mm wide test strips. By including the release sheet 56 in the sample, an adhesion-free edge of the polyester film 50 is obtained in each test strip.

Each test strip is then placed in an Instron tensile testing machine. In particular, the free edge of the polyester film 50 where the release sheet 56 is located is placed in one jaw and the opposing portion of the sample comprised of the polypropylene layer 54 and the polyester film 52 is placed in the opposite jaw. An aluminum backing plate is fixed in the upper grip adjacent to the upper portion of the PET laminate. This plate hangs down behind the peel specimen and forces the tab comprising the adhesively bonded material to bend down parallel to the clamped tabs. The Instron machine is set at a rate of 100 mm per minute, and a 180° peel test is performed. Average peel force is recorded when steady state conditions are achieved. The machine indicates a peel strength in pounds of force per inch of laminate width. At least 4, but typically 4-6 peel tests are conducted for each laminate to determine an average peel force.

In addition to displaying good initial bond strengths, the bonding material of the present disclosure is also capable of retaining a significant portion of the initial bond strength even when subjected retort testing. For instance, the bonding material is capable of retaining at least about 25% of its initial bond strength even when exposed to an environment at 121° C. and 100% RH for 180 min. For instance, the bonding material may retain greater than about 30%, such as greater than about 40%, such as even greater than about 50%, such as even greater than about 75%, such as about 100% of its initial bond strength when subjected to the above conditions.

Figure 1:
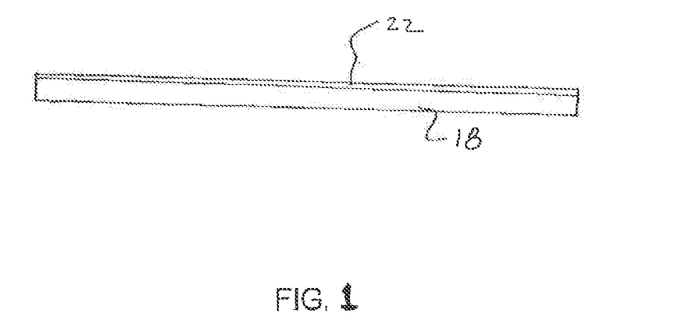
FIG. 1 is a cross-sectional view of one embodiment of a coated polymer film made in accordance with the present disclosure.

Referring to FIG. 1, one embodiment of a coated polymer film made in accordance with the present disclosure is shown. The coated film includes a film layer 18 that may comprise a polyester polymer. For instance, film 18 can be formed from polyethylene terephthalate. In accordance with the present disclosure, the film 18 is coated on at least one side with a bonding layer 22. In the embodiment illustrated in FIG. 1, the bonding layer 22 is applied to one side of the film 18. In an alternative embodiment, however, the bonding layer 22 can be applied to both surfaces of the film 18.

In accordance with the present disclosure, the bonding layer 22 comprises an adhesive agent combined with a cross-linking agent. In one embodiment, the adhesive agent comprises an acid or an acid anhydride modified olefin polymer. In one particular embodiment, for instance, the adhesive agent comprises a carboxylic acid or carboxylic acid anhydride modified olefin polymer. For instance, the adhesive agent may comprise a carboxylic acid modified polypropylene homopolymer or copolymer. The carboxylic acid may include a carboxylic acid or an anhydride of a carboxylic acid. In one embodiment, the carboxylic acid or anhydride has a carbon chain length of from about 1 carbon atom to about 10 carbon atoms.

The carboxylic acid or anhydride may be saturated or unsaturated. In one embodiment, the carboxylic acid or anhydride comprises a dicarboxylic acid or dicarboxylic acid anhydride. For instance, the carboxylic acid may comprise an unsaturated, dicarboxylic acid anhydride, such as an anhydride of maleic acid. For example, in one embodiment, the adhesive agent comprises a maleated polypropylene dispersion that is combined with the cross-linking agent and applied to the polyester film. In one embodiment, EIF-1312 dispersion obtained from Michelman is used as the adhesive agent.

In addition to the acid or acid anhydride modified olefin polymer, the adhesive agent may comprise various other components. For instance, in one embodiment, the adhesive agent may also include more than one acid or acid anhydride. In one embodiment, the adhesive agent may comprise a fatty acid, such as a saturated fatty acid. In particular, the fatty acid may have a carbon chain length of from about 6 carbon atoms to about 28 carbon atoms, such as from about 6 carbon atoms to about 18 carbon atoms. In one embodiment, for instance, the adhesive agent may contain octanoic acid, decanoic acid, or mixtures thereof.

In one embodiment, the adhesive agent may also contain a surfactant. For instance, in one embodiment, a surfactant may be present that comprises an alkoxylated compound, such as an ethoxylated compound. In one embodiment, for instance, the adhesive agent may contain an ethoxylated alcohol. The ethoxylated alcohol can be made with an alcohol having a carbon chain length of from about 6 carbon atoms to about 48 carbon atoms, such as from about 8 carbon atoms to about 36 carbon atoms. The ethoxylated alcohol can contain from about 2 units to about 20 units, such as from about 5 units to about 10 units of ethylene oxide per each alcohol.

As described above, the adhesive agent is combined with a cross-linking agent. The cross-linking agent comprises at least one water-miscible or water-dispersible component which bears reactive groups which can enter into cross-linking reactions, for example polymers with oxazoline groups, carbodiimide groups, epoxy groups, isocyanate groups or melamine. As used herein, the above polymers are referred to as oxazoline polymers, carbodiimide polymers, epoxies, isocyanates, or melamines. Among these, especially polymers with oxazoline or carbodiimide groups are preferred.

Polymers containing oxazoline groups are macromolecular compounds which form through addition polymerization of a) oxazoline derivatives according to the structural formulae (I) to (III) and b) at least one further comonomer.

(I)

(II)

(III)

In the structural formulae (I) to (III) depicted above, the R1, R2, R3 and R4 radicals may each independently represent hydrogen atoms, halogen atoms, alkyl groups, aralkyl groups, phenyl groups or substituted phenyl groups. R5 is a noncyclic radical which contains a polymerizable double bond.

Examples of halogen atoms are fluorine, chlorine, bromine and iodine, preference being given to chlorine and bromine. Examples of alkyl groups are methyl, ethyl, n-propyl, isopropyl, n-butyl, isobutyl, pentyl and hexyl groups. Aralkyl groups are understood to mean those radicals which contain alkyl groups with a chain length of 1 to 5 carbon atoms, for example benzyl, phenethyl, benzhydryl and naphthylmethyl groups. Substituted phenyl groups may, for example, be chlorophenyl, bromophenyl, methoxyphenyl, ethoxyphenyl, methylaminophenyl, ethylaminophenyl, dimethylaminophenyl, methylethylaminophenyl and diethylaminophenyl. Examples of noncyclic radicals with polymerizable double bonds are vinyl and isopropenyl groups.

Examples of oxazoline derivatives a) include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-ethyl-2-oxazoline. To prepare polymers bearing oxazoline groups, it is possible to use the oxazoline derivatives a) either individually or in a combination of two or more of the compounds mentioned. Among the oxazoline derivatives mentioned, 2-isopropenyl-2-oxazoline is particularly preferred.

The comonomers b) used may in principle be all compounds which are copolymerizable with oxazoline derivatives a). Examples of comonomers b) are methacrylic esters such as methyl methacrylate, butyl methacrylate and 2-ethylhexyl methacrylate, unsaturated carboxylic acids such as methacrylic acid, itaconic acid and malonic acid, unsaturated nitriles such as methacrylonitrile, unsaturated amides such as methacrylamide and N-methylolmethacrylamide, vinyl esters such as vinyl acetate and vinyl propionate, vinyl ethers such as methyl vinyl ether, ethyl vinyl ether, alpha-olefins such as ethene, propene, halogenated alpha,beta-unsaturated compounds such as vinyl chloride, vinylidene chloride and vinyl fluoride, and also alpha,beta-unsaturated aromatic compounds such as styrene and alpha-methylstyrene. The comonomers b) mentioned may be used either individually or in a combination of 2 or more compounds.

The polymer containing oxazoline groups can be prepared, for example, by adding an oxazoline derivative a), at least one comonomer b) and a free-radical initiator, for example benzoyl peroxide or azoisobutyronitrile, to a suitable water-miscible organic solvent and heating the resulting solution. After the polymerization has ended, water can be added and the organic solvent can be removed completely or partially by distillation, which leaves an aqueous polymer dispersion containing oxazoline groups, which is directly suitable for preparation of the inventive coating solution.

Alternatively, it is also possible to polymerize oxazoline derivative(s) a) and comonomer(s) b) anionically, for example with n-butyllithium.

The content of oxazoline groups in the dried polymer is typically 0.5 to 10 mmol/g, preferably 1.5 to 8 mmol/g. The glass transition temperature of the dried polymer is in the range between 0 and 100° C., preferably 20 to 95° C.

Suitable aqueous polymer dispersions containing oxazoline groups are commercially available under the name "EPOCROS®" from Nippon Shokubai (Japan). In this context, water-soluble, solvent-free products of the "EPOCROS®WS" series from the abovementioned manufacturer are particularly suitable for the inventive coating solution.

Polymers containing carbodiimide groups are macromolecular compounds which bear at least two carbodiimide groups per molecule and which can be prepared by polycondensation of diisocyanates in the presence of catalysts. Corresponding processes are prior art and are described, inter alia, in EP-A-0 878 496 (whose United States equivalent is U.S. Pat. No. 6,124,398). Suitable starting materials for preparing polymers containing carbodiimide groups are aromatic, aliphatic and alicyclic diisocyanates, for example toluene diisocyanate, xylene diisocyanate, diphenylmethane diisocyanate, hexamethylene diisocyanate, cyclohexane diisocyanate, isophorone diisocyanate and dicyclohexyl diisocyanate.

Polymers containing carbodiimide groups may also contain surfactants, polyalkylene oxides or hydrophilic monomers, for example quaternary ammonium salts, dialkylamino alcohols and hydroxyalkylsulfonic acid, in order to improve the solubility or dispersibility.

Polymers containing epoxy groups are, for example, bisphenol-epichlorohydrin-based polymers, cycloaliphatic polymeric epoxides, epoxy compounds based on Novolac, epoxy-olefin polymers, epoxy compounds based on polyol-glycidyl compounds and epoxysilane polymers. Especially suitable are polyethylene glycol diglycidyl ether, polypropylene glycol diglycidyl ether, neopentyl glycol diglycidyl ether, 1,6-hexaneglycol diglycidyl ether, glycerol polyglycidyl ether, trimethylolpropane polyglycidyl ether, sorbitol polyglycidyl ether and bisphenol A diglycidyl ether.

Polymers containing isocyanate groups are polyisocyanates, for example 2,4-toluene diisocyanate, 2,6-toluene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5- tetrahydronaphthalene diisocyanate, tetramethylene diisocyanate, 1,6-hexamethylene diisocyanate, dodecamethylene diisocyanate, trimethylhexamethylene diisocyanate, 1,3-cyclohexylene diisocyanate, 1,4-cyclohexylene diisocyanate, xylene diisocyanate, tetramethylxylylene diisocyanate, hydrogenated xylene diisocyanate, lysine diisocyanate, isophorone diisocyanate, 4,4'-dicyclohexyl diisocyanate, 3,3-dimethyl-4,4'-dicyclohexylmethane diisocyanate, tetramethylxylene diisocyanate, and polymers with isocyanate end groups from the reaction of the abovementioned compounds with a trifunctional polyisocyanate of the isocyanurate or biuret type, or a dihydric or higher polyhydric polyol.

Melamine is understood to mean compounds which can be prepared by the reaction of methylolmelamine derivatives, obtainable by condensation of melamine and formaldehyde with lower alcohols, for example methanol, ethanol and isopropanol (or mixtures of these alcohols). Examples of methylolmelamine derivatives are monomethylolmelamine, dimethylolmelamine, trimethylolmelamine, tetramethylolmelamine, pentamethylolmelamine and hexamethylolmelamine.

In addition to the adhesive agent and the cross-linking agent, the coating composition may contain various other ingredients. In one embodiment, for instance, the coating may contain one or more antiblocking agents. For example, the antiblocking agent may comprise inorganic and/or organic particles. Particular examples of antiblocking agents include silicone dioxide, calcium carbonate, and aluminum oxide. In another embodiment, for instance, the coating may contain antifoaming or defoaming agents.

The relative amounts of the components in the bonding layer or coating can vary depending upon various factors. In one embodiment, for instance, the dried coating can contain the adhesive agent and cross-linking agent in a weight ratio of from about 3:7 to about 20:1, such as from about 2:3 to about 4:1, such as from about 2:3 to about 3:2. In various embodiments, the weight ratio of the adhesive agent to the cross-linking agent can be from about 1:1 to about 20:1, such as from about 1:1 to about 9:1, such as from about 6:4 to about 9:1, such as from about 6:4 to about 8:2, such as from about 7:3 to about 9:1, such as from about 7:3 to about 8.5:1. In one particular embodiment, the adhesive agent and cross-linking agent are present in the coating at a weight ratio of from about 1:2 to about 5:1, such as from about 2:1 to about 4:1. In another embodiment, the adhesive agent and cross-linking agent are present in the coating at a weight ratio of from about 1.2:1 to about 1:1.2. In one embodiment, the adhesive agent is present in an amount greater than the cross-linking agent, based on weight.

The dried coating on the polyester film can generally have a thickness from about 5 nm to about 500 nm. For instance, the dried coating can have a thickness from about 10 nm to about 100 nm, such as from about 10 nm to about 60 nm. The polyester film, on the other hand, can typically have a thickness of greater than about 0.1 mils, such as greater than about 0.5 mils, such as greater than about 1 mils, such as greater than about 2 mils. The polyester film has a thickness of less than about 15 mils, such as less than about 12 mils, such as less than about 10 mils, such as less than about 8 mils, such as less than about 5 mils.

The bonding layer may be formed on the polymer film using any suitable technique or method. In one embodiment, the components of the bonding layer are contained in an aqueous composition and applied to the polymer film while the polymer film is being formed. The coating composition, for instance, can have about 0.5% to about 30% solids, such as from about 1% to about 10% solids.

In one particular embodiment, the coating composition is printed onto one or both sides of the polymer film or polyester film. Printing the coating composition onto the film can provide numerous advantages. For instance, printing can control the amount applied and/or the area that is covered. In one embodiment, the coating composition is printed onto the film using gravure printing.

In the embodiment illustrated in FIG. 1, only one side of the polymer film 18 is coated with the bonding layer 22. It should be understood, however, that in other embodiments both sides of the polymer film may be coated. In this manner, the polymer film can be laminated to the same or different substrates on either side.

In one embodiment, the polymer film 18 can include the bonding layer 22 on one side of the film and can include a second coating on the opposite side of the film. As described above, the second coating can be substantially the same as the bonding layer 22. In an alternative embodiment, however, the second coating may be different than the bonding layer 22.

For instance, in one embodiment, the second coating applied to the second side of the film may comprise only the cross-linking agent, such as an oxazoline-modified polymer. In one embodiment, for instance, the oxazoline-modified polymer may comprise an oxazoline-modified acrylic polymer. In one embodiment, the cross-linking agent can be applied to the second side of the film in an amount of from about 0.01% by weight to about 25% by weight, such as from about 0.1% by weight to about 10% by weight. In one embodiment, the cross-linking agent can be applied to the second side of the film in an amount of from about 0.001% by weight to about 4% by weight, such as from about 0.01% by weight to about 1% by weight. The second coating can comprise solely the cross-linking agent or can contain the cross-linking agent in an amount greater than about 20% by weight, such as in an amount greater than about 60% by weight, such as in an amount greater than about 80% by weight, such as in an amount greater than about 90% by weight. The second coating comprising primarily the cross-linking agent is well suited for bonding to various polymer compositions, particularly polyurethane polymers. In one particular embodiment, for instance, the second coating may be used to bond the film to a polyurethane adhesive which can then be adhered to various other shaped articles. For example, a polyurethane adhesive may be bonded to the second coating and also bonded to an article, such as a shaped metallic, ceramic, paper, or wood-based article. In one embodiment, the article may be a metallic article. In this manner, a laminate can be formed in accordance with the present disclosure that includes a polypropylene layer bonded to the polyester film, which is then in turn bonded to a metallic article via a polyurethane adhesive.

The polymer film 18 as shown in FIG. 1 can generally comprise any suitable polymer. For instance, polyester films are particularly well suited for use in the present disclosure. The polyester used to construct the film may comprise polyethylene terephthalate, polyethylene naphthalate or polybutylene terephthalate. The polymer film may also comprise copolyesters, such as polyethylene terephthalate isophthalate. Generally, any polyester film based on a polymer resulting from polycondensation of a glycol or diol with a dicarboxylic acid (or its ester equivalent) such as terephthalic acid, isothalic acid, sebacic acid, malonic acid, adipic acid, azelaic acid, glutaric acid, suberic acid, succinic acid, or mixtures thereof. Suitable glycols include ethylene glycol, diethylene glycol, polyethylene glycol, and polyols such as butanediol and the like. Mixtures of two or more of the foregoing are also suitable.

Any of the above based polymer films can contain conventional additives such as antioxidants, delusterants, pigments, fillers such as silica, calcium carbonate, kaolin, titanium dioxide, antistatic agents and the like or mixtures thereof. In one embodiment, for instance, a filler may be present in the polymer film sufficient to colorize the film and increase the opacity of the film. In one embodiment, for instance, the film can include a filler to make the film have a white appearance. One filler that may be used, for instance, is barium sulfate. Barium sulfate may be present in the film in an amount from about 5% to about 30% by weight, such as from about 15% to about 25% by weight. In an alternative embodiment, the filler may comprise titanium dioxide. Titanium dioxide may be present in the film in order to form a weatherable skin layer on a polymeric article. The titanium dioxide may be present in the film layer in an amount from about 5% to about 20% by weight, such as in an amount from about 10% to about 15% by weight.

For a further increase in the whiteness, suitable optical brighteners can optionally be added to the pigmented film (in a multilayer structure preferably to the pigmented layers). Suitable optical brighteners are, for example, HOSTA-LUX® KS (from Clariant, Germany) or EASTOBRIGHT® OB-1 (from Eastman, USA).

In an alternative embodiment, the polyester film may contain no colored fillers. Consequently, the film can be translucent or transparent. In one particular embodiment, for instance, the polyester film may be clear and transparent.

The film may comprise further particles as antiblocking agents in one or more layers. Typical antiblocking agents are inorganic and/or organic particles, for example silicon dioxide (precipitated or fumed), calcium carbonate, magnesium carbonate, barium carbonate, calcium sulfate, lithium phosphate, calcium phosphate, magnesium phosphate, kaolin (hydrated or calcined), aluminum oxide, aluminum silicates, lithium fluoride, calcium salts, barium salts, zinc salts or manganese salts of the dicarboxylic acids used, or crosslinked polymer particles, for example polystyrene or polymethyl methacrylate particles.

In addition, it is also possible to select mixtures of two or more particle systems or mixtures of particle systems with the same chemical composition but different particle size as antiblocking agent.

When particles are present as antiblocking agents in a layer of the film, the total concentration of these particles is less than 20% by weight, based on the total weight of the modified layer, preferably less than 15% by weight and more preferably less than 5% by weight. The particles have a mean size of 0.01 to 15 μm, preferably 0.03 to 10 μm and more preferably 0.05 to 5 μm.

The film may comprise further additives such as UV stabilizers, flame retardants, hydrolysis stabilizers and antioxidants.

UV stabilizers, i.e. UV absorbers as light stabilizers, are chemical compounds which can intervene in the physical and chemical processes of light-induced polymer degradation. Suitable UV stabilizers are, for example, 2-hydroxybenzophenones, 2-hydroxybenzotriazoles, organonickel compounds, salicylic esters, cinnamic ester derivatives, resorcinol monobenzoates, oxanilides, hydroxybenzoic esters, benzoxazinones, sterically hindered amines and triazines, preference being given to the 2-hydroxybenzotriazoles, the benzoxazinones and the triazines. In a very particularly preferred embodiment, the inventive film comprises, as a UV stabilizer, 0.1 to 5.0% by weight of 2-(4,6-diphenyl[1,3,5]triazin-2-yl)-5-hexyloxyphenol of the formula or 0.1 to 5.0% by weight of 2,2'-methylenebis[6-benzotriazol-2-yl]-4-(1,1,2,2-tetramethylpropyl)phenol of the formula or 0.1 to 5.0% by weight of 2,2'-(1,4-phenylene)bis([3,1]benzoxazin-4-one) of the formula In a further embodiment, it is also possible to use mixtures of these UV stabilizers or mixtures of at least one of these UV stabilizers with other UV stabilizers, where the total concentration of light stabilizers is preferably between 0.1 and 5.0% by weight, more preferably in the range from 0.5 to 3.0% by weight, based on the weight of the film.

The films may be produced by any well known technique in the art. For example, polyester is typically melted and extruded as an amorphous sheet onto a polished revolving casting drum to form a cast sheet of the polymer. The sheet is quickly cooled and then stretched or oriented in one or more directions to impart strength and toughness to the film. For instance, the sheet can be uniaxially stretched or biaxially stretched.

During extrusion, the temperature of the film is generally below about 300° C. For instance, the temperature during extrusion can be from about 275° C. to about 295° C.

Stretching of the film can generally occur as the film is being produced, although stretching can also be conducted offline. Biaxial stretching, for instance, is generally carried out in succession, but can take place simultaneously. When done in succession, stretching typically first takes place longitudinally (in the machine direction) and then transversely (in the transverse direction perpendicular to the machine direction). Stretching the film leads to spatial orientation of the polymer chains. The longitudinal stretching can be carried out with the aid of two rolls rotating at different speeds corresponding to the desired stretching ratio. For the transverse stretching, an appropriate tenter frame can be used in which the film is clamped at the two edges and then drawn towards the two sides at an elevated temperature.

Generally, stretching occurs at a temperature range of from about the second order transition temperature of the polymer to below the temperature at which the polymer softens and melts. In one embodiment, for instance, longitudinal stretching can be carried out at a temperature in the range of from about 80° C. to about 130° C., while the transverse stretching can be carried out at a temperature in the range of from about 90° C. to about 150° C.

The longitudinal stretching ratio can generally be in the range of from about 2:1 to about 6:1, such as from about 2:1 to about 5:1. The transverse stretching ratio is also generally from about 2:1 to about 6:1, such as from about 3:1 to about 5:1.

Where necessary, the film can be further heat treated after stretching to lock-in the properties by further crystallizing the film. The crystallization imparts stability and good tensile properties to the film. Heat treatment, for instance, can generally be conducted at a temperature of from about 150° C. to about 250° C., such as from about 190° C. to about 240° C. Coated films of the present disclosure, for instance, can be exposed to heat at a temperature of from about 210° C. to about 250° C. for a period of from about 1 to about 20 seconds.

The polymer film can generally have a thickness of from about 0.1 mils to about 15 mils, such as from about 0.5 mils to about 10 mils, such as from about 1 mils to about 6 mils.

In order to coat the film in accordance with the present disclosure, in one embodiment, the coating composition is applied to the film in-line. In particular, the coating composition is applied to the film while the film is being produced and before the film has been completely stretched or heat set. For instance, in one embodiment, the coating composition can be applied to the polymer film after corona treatment and prior to stretch orientation. In one particular embodiment, for instance, the coating composition can be applied to the film in-line by means of an aqueous dispersion after the longitudinal stretching step but prior to the transverse stretching step.

In addition to in-line coating, the coating composition can also be applied to the film off-line. Thus, the coating composition can be applied to the film after the film has been produced and cooled. When coating both sides of the film, for instance, one side of the film can be coated in-line, while the other side of the film can be coated off-line.

Example 1

PET pellets were introduced into a single screw extruder where they were heated and compressed into a melt state. This melt was extruded through a slot die and cast onto a casting roll kept at about 20° C., where it solidified into an amorphous preliminary film. The preliminary film was longitudinally stretched at 95° C. at a stretching ratio of 3.6:1. The stretched film was passed under a corona treater (Enercon Industries) and corona treated at 1.5 W/ft$^2$·min.

Subsequently, the longitudinally stretched film was coated by means of a reverse gravure coating roll with an aqueous dispersion containing 1% or 5% total solids content, having a ratio of EIF-1312 adhesive dispersion to EPOCROS WS700 crosslinking agent ranging from 1:1 to 1:0. This coating was applied to the corona treated PET film surface via reverse gravure coating roll at a wet coating weight of 0.4 lb/1000 ft$^2$. The coating was dried and crosslinked during transit through a tenter tunnel. The final film was 2 mils (50 microns) thick, clear, and primed on one side with the inventive coating.

The coated PET film was then evaluated by sandwiching a strip of 4 mil (100 micron) thick×1" wide homopolymer polypropylene sheet between two sheets of 2 mil coated PET film with the inventive primer facing the PP sheet. This sandwich was placed between the 1.0 in wide bars of a lab sealer set at 400° F. and 50 psi pressure. The sandwich was laminated for 2 sec, 4 sec, or 8 sec. Alternately, the film samples were sealed directly to a 3.5 mil coextruded packaging film with the LDPE-based sealant layer of the packaging film against the inventive coating of the PET film. This sandwich was laminated for 2 sec, 4 sec, or 8 sec. After thermal lamination, each sandwich was allowed to cool and then cut into 1" wide×6" long coupons for peel testing. The peel test samples were evaluated by 180° peel testing on an MTS testing rig. Four coupons were tested from each coated sample and average peel force values reported. In samples #6-#8, the adhesive bond between homopolymer PP and the coating was stronger than the cohesive strength of the PET film, so the PET film tore before the adhesive bond failed. Reported average peel force for these samples are lower limits.

| Sample No. | Ratio Adhesive/ Crosslinker | Coating Solids (%) | Avg Peel Force against LDPE - 2 sec seal (lbf/inch) | Avg Peel Force against LDPE - 4 sec seal (lbf/inch) | Avg Peel Force against PP - 8 sec seal (lbf/inch) | Mode of Peel Failure against PP |
|---|---|---|---|---|---|---|
| 1 | 1:1 | 1 | 0.1 | — | 0.1 | Delam |
| 2 | 3:1 | 1 | 0.1 | — | 0.2 | Delam |
| 3 | 9:1 | 1 | 0.1 | — | 0.0 | Delam |
| 4 | 1:0 | 1 | 0 | — | 0.0 | Delam |
| 5 | 1:1 | 5 | 2.5 | 5.0 | 6.3 | Delam |
| 6 | 3:1 | 5 | 2.6 | 4.8 | >9.6 | PET Tore |
| 7 | 4:1 | 5 | 2.6 | 5.0 | >6.9 | PET Tore |
| 8 | 1:0 | 5 | 0.2 | 0.2 | 0.0 | PET Tore |

Example 2

Film samples were produced by the process described in Example 1. The film samples were sealed directly to a 3.5 mil coextruded packaging film with the LDPE-based sealant layer of the packaging film against the inventive coating of the PET film. This sandwich was laminated for 2 sec. After thermal lamination, the sandwich was allowed to cool and then cut into 1" wide×6" long coupons. Coupons were placed in a pressure chamber and subjected to a heat treatment cycle for 180 minutes at 121° C. and 100% RH to simulate a retort process. Upon removal and drying, the peel test samples were evaluated by 180° peel testing on an MTS testing rig. Four coupons were tested from the retorted sample and average peel force values are reported along with the peel force data for coupons of the same construction that were sealed for 2 sec and 4 sec, but were not subjected to the retort process.

| Sample No. | Ratio Adhesive/ Crosslinker | Coating Solids (%) | Seal Time (sec) | Retorted 180 min @ 121° C. & 100% RH | Average Peel Force against LDPE (lb/inch) |
|---|---|---|---|---|---|
| 9 | 1:1 | 5 | 2 | No | 2.5 |
| 10 | 1:1 | 5 | 4 | No | 5.0 |
| 11 | 1:1 | 5 | 2 | Yes | 5.0 |

Example 3

18% barium sulfate-filled PET pellets were introduced into a single screw extruder where they were heated and compressed into a melt state. This melt was extruded through a slot die and cast onto a casting roll kept at about 20° C., where it solidified into an amorphous preliminary film. The preliminary film was longitudinally stretched at 95° C. at a stretching ratio of 3.6:1. The stretched film was passed under a corona treater (Enercon Industries) and corona treated at 1.5 W/ft²·min.

Subsequently, the longitudinally stretched film was coated by means of a reverse gravure coating roll with an aqueous dispersion containing 5% solids content of EPOCROS WS700 crosslinking agent EIF-1312 adhesive agent mixed at a ratio of 1:1, and then stored for 30 days under ambient conditions to establish compositional stability. After 30 days, this coating was applied to the corona treated PET film surface via reverse gravure coating roll at a wet coating weight of 0.4 lb/1000 ft². The coating was dried and crosslinked during transit through a tenter tunnel. The final film was 1.42 (36 microns) mils thick, opaque white (from cavitation due to 18% loading of barium sulfate particles), and primed on one side with the inventive coating.

The coated PET film was then evaluated by sandwiching a strip of 0.0185" thick×0.5" wide homopolymer PP (tray PP) between two sheets of 1.42 mil coated PET film with the primer facing the PP sheet. This sandwich was placed between the 0.75" wide bars of a lab sealer set at 400° F. and 50 psi pressure. The sandwich was laminated 12 sec. After thermal lamination, the sandwich was allowed to cool and then cut into 1" wide×6" long coupons for peel testing. After lamination, total sandwich thickness was 0.022". The peel test samples were evaluated by 180° peel on an MTS testing rig. Four samples were tested and demonstrated an average peak load of 2.9 lbf/inch before the peel samples failed. In all four peel tests, the peel test sample failed by cohesive failure of the PET film. The adhesive bond between homopolymer PP and the coating was stronger than the cohesive strength of the white PET film.

Example 4

PET pellets were blended with a titanium dioxide PET masterbatch and introduced into a single screw extruder where they were heated and compressed into a melt state. This melt containing 13% TiO2 was extruded through a slot die and cast onto a casting roll kept at about 20° C., where it solidified into an amorphous preliminary film. The preliminary film was longitudinally stretched at 95° C. at a stretching ratio of 3.6:1. The stretched film was passed under a corona treater (Enercon Industries) and corona treated at 1.5 W/ft²·min.

Subsequently, the longitudinally stretched film was coated by means of a reverse gravure coating roll with an aqueous dispersion containing 2%-5% total solids content, and having ratios of EPOCROS WS700 crosslinking agent and EIF-1312 adhesive dispersion ranging from 0:1 to 1:0. This coating was applied to the corona treated PET film surface via reverse gravure coating roll at a wet coating weight of 0.4 lb/1000 ft². The coating was dried and crosslinked during transit through a tenter tunnel. The final film was 2 mils (50 microns) thick, opaque white, and primed on one side with the inventive coating.

The coated PET film was then evaluated by sandwiching a strip of 4 mil (100 micron) thick×1" wide homopolymer polypropylene sheet between two sheets of 2 mil coated PET film with the primer facing the PP sheet. This sandwich was placed between the 0.75" wide bars of a lab sealer set at 400° F. and 50 psi pressure. The sandwich was laminated 9 for seconds. After thermal lamination, the sandwich was allowed to cool and then cut into 1" wide×6" long coupons for peel testing. The peel test samples were evaluated by 180° peel on an MTS testing rig. Four coupons were tested from each coated sample and peel force values reported. In samples #12-#14 and #16-#19, the adhesive bond between homopolymer PP and the coating was stronger than the cohesive strength of the PET film.

| Sample No. | Ratio Adhesive/ Crosslinker | Coating Solids (%) | Avg Peel Force against LDPE (lbf/inch) | Avg Peel Force against PP (lbf/inch) | Max Peel Force against PP (lbf/inch) | Mode of Peel Failure against PP |
|---|---|---|---|---|---|---|
| 12 | 3:1 | 5 | — | — | 8.3 | PET tore |
| 13 | 3:1 | 4 | — | — | — | PET tore |
| 14 | 3:1 | 3 | — | — | — | PET tore |
| 15 | 3:1 | 2 | — | 2.0 | 2.7 | Debond |
| 16 | 3:2 | 5 | 3.6 | — | 9.7 | PET tore |
| 17 | 4:1 | 5 | 3.4 | — | 5.6 | PET tore |
| 18 | 6.5:1 | 5 | 3.5 | — | 11.0 | PET tore |

-continued

| Sample No. | Ratio Adhesive/ Crosslinker | Coating Solids (%) | Avg Peel Force against LDPE (lbf/inch) | Avg Peel Force against PP (lbf/inch) | Max Peel Force against PP (lbf/inch) | Mode of Peel Failure against PP |
|---|---|---|---|---|---|---|
| 19 | 9:1 | 5 | 4.2 | — | 7.1 | PET tore |
| 20 | 1:0 | 5 | 0 | 0 | 0 | Debond |
| 21 | 0:1 | 2.5 | 0 | 0 | 0 | Debond |

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A coated film comprising:
   a biaxially stretched polyester film having a first side and a second side; and
   a reacted coating on the first side of the polyester film, the coating comprising a bonding layer forming a hydrophobic interface between the biaxially stretched polyester film and the bonding layer, the bonding layer containing hydrophobic components, the hydrophobic components comprising an adhesive agent and a cross-linking agent, the adhesive agent comprising an acid or acid anhydride modified polypropylene homopolymer or copolymer, the acid or acid anhydride used to modify the polypropylene homopolymer or copolymer having a carbon chain length of from about 1 carbon atom to about 28 carbon atoms.

2. The coated film as defined in claim 1, wherein the acid or acid anhydride modified polypropylene homopolymer or copolymer comprises a carboxylic acid or carboxylic acid anhydride modified polypropylene homopolymer or copolymer.

3. The coated film as defined in claim 2, wherein the carboxylic acid or carboxylic acid anhydride modified polypropylene is formed from a dicarboxylic acid or a dicarboxylic acid anhydride.

4. The coated film as defined in claim 2, wherein the carboxylic acid or carboxylic acid anhydride modified polypropylene is formed from a carboxylic acid anhydride.

5. The coated film as defined in claim 4, wherein the carboxylic acid anhydride is an anhydride of maleic acid.

6. The coated film as defined in claim 1, wherein the coating contains the adhesive agent and the cross-linking agent at a weight ratio of from about 3:7 to about 20:1.

7. The coated film as defined in claim 1, wherein the cross-linking agent contained in the coating comprises an oxazoline polymer.

8. The coated film as defined in claim 1, wherein the polyester film contains white pigment particles comprising barium sulfate particles and wherein the polymer film has a Berger whiteness of greater than about 70.

9. The coated film as defined in claim 1, wherein the polyester film contains pigment particles comprising titanium dioxide particles present in the film in an amount from about 5% to about 20% by weight.

10. The coated film as defined in claim 1, wherein the polyester film comprises a biaxially stretched polyester film that has a thickness of from about 0.1 mils to about 15 mils and the coating has a thickness of from about 10 nm to about 60 nm.

11. The coated film as defined in claim 1, wherein the polyester film further includes a second coating on the second side of the polyester film, the second coating comprising the cross-linking agent.

12. The coated film as defined in claim 11, wherein the second coating comprises the cross-linking agent combined with the adhesive agent.

13. The coated film as defined in claim 1, wherein the cross-linking agent comprises an oxazoline polymer formed from
   a. at least one oxazoline derivative according to one of the structural formulae (I) to (III) and
   b. at least one further comonomer, where the $R_1$, $R_2$, $R_3$ and $R_4$ radicals in the structural formulae (I) to (III) each independently represent hydrogen atoms, halogen atoms, alkyl groups, aralkyl groups, phenyl groups or substituted phenyl groups, and $R_5$ is a noncyclic radical with a polymerizable double bond.

14. The coated film as defined in claim 13, wherein the comonomer (b) comprises one or more of the following compounds: methacrylic esters, unsaturated carboxylic acids, unsaturated nitrites, unsaturated amides, vinyl esters, vinyl ethers, alpha-olefins, halogenated alpha,beta-unsaturated compounds or alpha,beta-unsaturated aromatic compounds.

15. The coated film as defined in claim 1, wherein the polyester film comprises polyethylene terephthalate.

16. The coated film as defined in claim 1, wherein the cross-linking agent comprises an oxazoline modified acrylic polymer.

17. A laminate comprising:
a polyester film having a first side and a second side;
a reacted bonding layer forming an interface between the polyester film and the reacted bonding layer that is hydrophobic, the reacted bonding layer containing hydrophobic components comprising an adhesive agent and a cross-linking agent, the adhesive agent comprising an acid or acid anhydride modified polypropylene homopolymer or copolymer, the acid or acid anhydride used to modify the polypropylene homopolymer or copolymer having a carbon chain length of from about 1 carbon atom to about 28 carbon atoms; and
a polymer substrate bonded to the polyester film, the reacted bonding layer being positioned between the polyester film and polymer substrate, the coating bonding the polymer substrate to the polyester film, and wherein the polymer substrate comprises a polyolefin.

18. The laminate as defined in claim 17, wherein the polyolefin comprises a polypropylene, copolymers thereof, or a combination thereof.

19. The laminate as defined in claim 17, wherein the polymer substrate comprises a molded article, a film, or a sheet.

20. The laminate as defined in claim 17, wherein the polymer substrate comprises a polypropylene homopolymer, linear low density polyethylene, copolymers thereof, or a combination thereof.

21. The laminate as defined in claim 19, wherein the polymer substrate is formed from a fiber reinforced polypropylene.

22. The laminate as defined in claim 17, wherein the adhesive agent comprises a maleated polypropylene copolymer and wherein the cross-linking agent comprises an oxazoline polymer.

23. The laminate as defined in claim 17, wherein the polyester film includes a coating on the second side of the film, the coating comprising a cross-linking agent.

24. The laminate as defined in claim 17, wherein the laminate further comprises a polyurethane adhesive bonded to the second side of the coating.

25. The laminate as defined in claim 24, wherein the laminate further comprises a shaped article bonded to the polyurethane adhesive, the shaped article comprising a metallic article.

26. The laminate as defined in claim 17, wherein the polyolefin comprises a polyethylene, copolymers thereof, or a combination thereof.

* * * * *